United States Patent Office 3,691,042
Patented Sept. 12, 1972

3,691,042
PROCESS FOR THE MANUFACTURE OF
ESTERIFIED HYDROXY COMPOUNDS
Robert Burns Woodward, 12 Oxford St.,
Cambridge, Mass. 02138
No Drawing. Original application Jan. 26, 1967, Ser.
No. 611,808, now Patent No. 3,498,996. Divided and
this application Feb. 25, 1969, Ser. No. 802,226
Claims priority, application Switzerland, Feb. 3, 1966,
1,531/66; Feb. 22, 1966, 2,509/66; June 17, 1966,
8,831/66
Int. Cl. C07d 91/16
U.S. Cl. 204—158 R          5 Claims

ABSTRACT OF THE DISCLOSURE

The invention concerns a process for the introduction of an acyloxy group into the 5-position of a 5-unsubstituted 2,2-disubstituted 3-acyl-thiazolidine 4-carboxylic acid derivative by treatment with an alkoxy radical-forming oxidation reagent in the presence of a reagent capable of furnishing an acyloxy group by homolytic cleavage, more especially the introduction of an acyloxy, especially an acetyloxy group into the 5-position of an ester, particularly the methyl ester of an acid of the formula

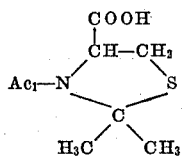

in which Ac₁ is an acyl radical, primarily the tert.-butyloxycarbonyl group, by treatment with a lead-IV-acrylate, particularly lead tetraacetate, in the presence of an alkanol, particularly tert.-butanol. The compounds of the process are useful as intermediates for the preparation of 7-amino-cephalosporanic acid and its derivatives.

CROSS-REFERENCES TO RELATED APPLICATIONS

This application is a division of our parent U.S. application Ser. No. 611,808, filed Jan. 26, 1967, and now U.S. Pat. No. 3,498,996.

The present invention relates to a method process for the manufacture of esterified hydroxy compounds, which process is particularly useful in the manufacture of valuable intermediate products, which are primarily used in the first synthesis of 7-amino-cephalosporanic acid and derivatives thereof.

7-amino-cephalosporanic acid has the following Formula XVI

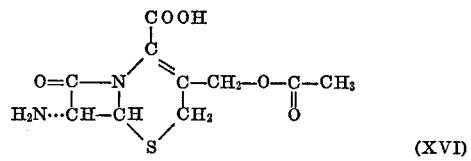

(XVI)

Derivatives thereof are mainly N-acyl compounds in which the acyl residues are especially those of active N-acyl derivatives of 7-amino-cephalosporanic acid, for example, thienylacetyl, e.g. 2-thienylacetyl, cyanoacetyl, chloroethylcarbamyl or phenylacetyl radicals, or easily eliminatable acyl radicals such as the radical of a semi-ester of carbonic acid, for example, the tert.-butyloxycarbonyl radical.

The synthesis of this important compound, which is of great value in the preparation of medicaments, and the derivatives thereof is based on the principle of using as starting material a 3,5-unsubstituted 2,2-disubstituted thiazolidine 4-carboxylic acid, for example, a compound of the Formula I

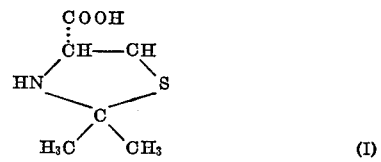

(I)

and carrying it out according to the pattern of the following flow sheet:

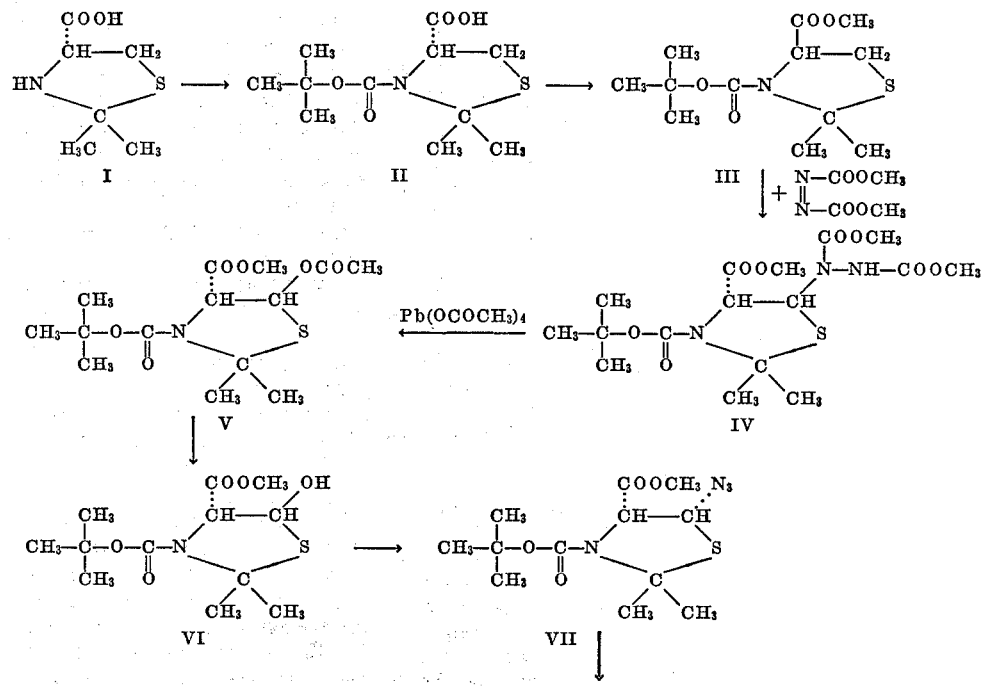

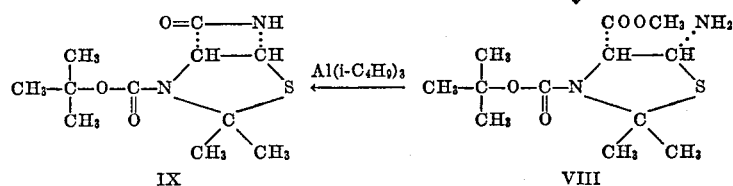

The compound IX is converted into the desired 7-amino-cephalosporanic acid and its derivatives as follows:

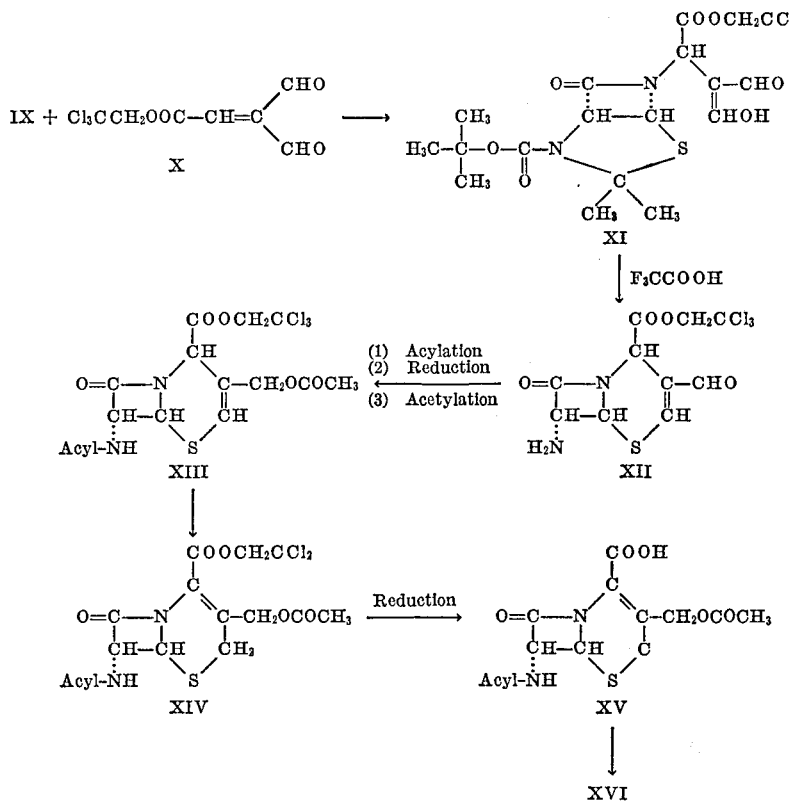

The compound of the Formula X which is used as intermediate product is prepared as follows:

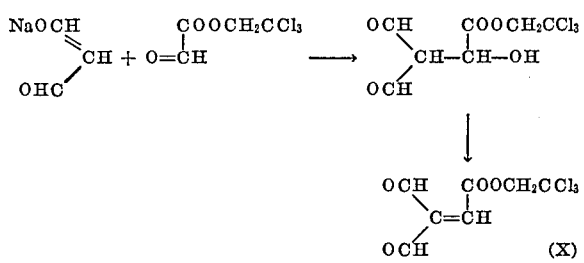

The esterified hydroxy compounds useful as intermediate products, particularly esters of the compound of Formula VI, such as the compound of the Formula V in the above flow sheet, are obtained in an unexpected way directly and without the introduction of a hydrazino group which is N,N'-disubstituted by functionally converted carboxyl groups, by introducing an esterified hydroxy group into the 5-position of a 5-unsubstituted, 2,2-disubstituted 3-acyl-thiazolidine 4-carboxylic acid derivative, such as a compound of the Formula III, by treatment with an alkoxy radical-forming oxidation reagent in the presence of a reagent capable of furnishing esterified hydroxy groups by homolytic cleavage, and, if desired, converting a substituent in a resulting compound into another substituent, and/or, if desired, separating a resulting mixture of isomers into the individual isomers.

The carboxylic acid derivatives of the starting material are especially esters with any type of hydroxy-compound suitable for the esterification of carboxylic acids, as well as nitrogen-containing carboxylic acid derivatives, such as amides, N-monosubstituted or particularly N,N-disubstituted, for example, by aliphatic residues, such as lower alkyl, e.g. methyl or ethyl groups, or sulfonyl, such as phenylsulfonyl groups, for example, N-phenylsulfonyl- or N-lower alkyl-N-phenylsulfonyl-amides.

The esterified hydroxy groups introduced into the 5-position of the starting material are, for example, hydroxy groups esterified by hydrohalic acids, i.e. halogen atoms, such as chlorine, bromine or iodine atoms; they are primarily acyloxy groups, in which "acyl" represents the corresponding residue of organic carboxylic acids. Acyl radicals are particularly those of aliphatic carboxylic acids, such as alkane, especially, lower alkane carboxylic acids, primarily acetic acid, as well as propionic or butyric acid, or of aromatic carboxylic acids, such as benzoic acid; these organic carboxylic acids may be unsubstituted or further substituted, for example, by lower alkyl or lower alkoxy groups or halogen atoms.

The alkoxy radical-forming oxidation reagents used in the procedure of this invention are those which are suitable for the one-electron oxidation of alkanols and/or are capable of forming an alkoxy radical by homolytic cleavage. Such reagents are, for example, alkoxy radical-forming peroxides, such as alkyl peroxides, for example, lower alkyl peroxides, e.g. di-tert.-butyl-peroxide, or di-acyl peroxides, particularly peroxy-carbonates, e.g. di-tert.-butyl peroxy-carbonate, or peroxalic acid esters, e.g. di-tert.-butyl peroxalate, as well as benzoylperoxide. Alkoxy radical-furnishing reagents are also alkyl esters, for example, lower alkyl, e.g. methyl, ethyl, isopropyl or n-butyl, particularly tert.-alkyl, especially tert.-butyl or 1,1-dimethylpropyl, as well as 3-methyl-2-butyl esters of hyponitrous acid.

Preferred alkoxy radical-forming oxidation reagents are alkanols in the presence of oxydizing heavy metal salts, particularly acylates, such as thallium-III-, cerium-IV- or iron-III-, primarily lead-IV-salts, particularly acylates. Alkanols are preferably lower alkanols, such as methanol, ethanol, isopropanol or n-butanol, particularly tert.-alkanols, such as tert.-lower alkanols, especially tert.-butanol or 1,1-dimethyl-propanol, as well as 3-methyl-2-butanol. Upon treatment of the oxidizing heavy metal salts upon alkanols corresponding alkoxy-heavy compounds are formed in situ and used as the alkoxy radical-forming oxidation reagents; in these "alkoxy" represents primarily a lower alkoxy, e.g. methoxy, ethoxy, isopropyloxy or n-butyloxy, primarily a tert.-alkoxy, especially tert.-butyloxy or 1,1-dimethyl-propyloxy, as well as 3-methyl-2-butyloxy radical. In order to slow down the oxidation of primary and secondary alkanols to carbonyl compounds, it is advantageous to gradually add the alcohol during the reaction to the reaction mixture containing the heavy metal compound, for example, the lead-IV-acylate.

The reagents capable of furnishing esterified hydroxy groups by homolytic cleavage and used in the presence of alkoxy radical-forming oxidation reagents are, for example, reagents capable of homolytically-furnishing halogen, such as molecular halogen, particularly iodine, hypohalogenites, particularly alkyl hypohalogenites, e.g. tert.-butyl hypochlorite, hypobromite or hypoiodite, sulfuryl halogenides, e.g. sulfuryl chloride or bromide, halogenated methane sulfonyl halides, e.g. trichloromethane sulfonyl chloride, tetrahalogeno-methane compounds, e.g. bromotrichloromethane or carbon tetrachloride, N-halogenated amide or imide compounds, such as halogeno-acetamides, -succinimides or -hydantoins, e.g. N-bromoacetamide, N-bromosuccinimide or N-chlorohydantoin, copper-II-halogenides, which may be complexed, for example, with tertiary bases, such as pyridine, 2,2'-bipyridyl or 4,5-phenanthroline, such as copper-II-chloride or -bromide, or other suitable halogenating reagents. Reagents furnishing halogen by homolytic cleavage are advantageously used together with the above-mentioned peroxide compounds as alkoxy radical-forming oxidation reagents; the introduction of the halogen radical into the 5-position of the starting material occurs advantageously while heating and/or irradiation. Preferably, the carboxylic acid derivative used as the starting material in the reaction involving the introduction of a halogen atom contains no activated hydrogen in the converted carboxyl group.

Preferred reagents furnishing esterified hydroxy groups by homolytic cleavage are primarily those yielding acyloxy groups. These are especially heavy metal acyl compounds, such as thallium-III-, cerium-IV-, iron-III- or copper-II-acylates, above all lead-IV-acylates, as well as mixed anhydrides of hyponitrous acid with organic carboxylic acids, for example, alkane carboxylic acids. Advantageously, lead tetraalkanoates, particularly lead tetraacetate, as well as lead tetrapropionate or lead tetrastearate, or lead tetrabenzoate or lead tetra-3-bromobenzoate, or the corresponding thallium-III-, cerium-IV-, iron-III- or copper-II-acylates are used. If desired or necessary, heavy metal acylates of this type, particularly cerium-IV- or iron-III-acylates may be formed in situ, i.e. from other heavy metal salts in the presence of acids furnishing acyloxy groups, or may, such as the copper-II-acylates, be used in the form of complexes. Reagents furnishing acyloxy groups by homolytic cleavage may be used in the presence of peroxides as the alkoxy radical-forming oxidation reagents; however the latter are advantageously alkanols in the presence of oxidizing heavy metal compounds, particularly alkoxy-heavy metal compounds formed in situ, especially alkoxy-lead-IV-compounds.

The two principles of the oxidation reagent forming the alkoxy radical and the reagent furnishing the acyloxy group by homolytic cleavage may also be combined in alkoxy-heavy metal-acylates of oxidizing heavy metals, particularly in alkoxy-lead-IV-acylates, such as lower alkoxy-lead-IV-acetates, advantageously formed during the reaction, as well as in anhydrides of alkyl-halfesters of hyponitrous acid with organic carboxylic acids; the use of such reagents forms a preferred embodiment of the present invention. Primarily such reagents are monoalkoxy-lead-IV-acylates, in which "alkoxy" and "acyl" have the previously given meaning; preferred are monolower alkoxy-lead-triacetates, such as monomethoxy-, monoethoxy-, monoisopropyloxy- or mono-n-butyloxy-, particularly mono-tert.-alkoxy-, especially mono-tert.-butyloxy- or mono-1,1-dimethyl-propyloxy-, as well as mono-3-methyl-2-butyloxy-lead-triacetate. As indicated above, these alkoxy-heavy metal-acylate compounds are usually formed in situ, e.g. upon treatment of alkanols with heavy metal acylates capable of furnishing acyloxy groups by homolytic cleavage. Advantageously, one uses equimolar amounts to an about 100-fold excess of the alkanol, calculated on the basis of heavy metal acylate, particularly lead-IV-acylate used; the latter, particularly a lead-IV-acylate, is preferably used in excess, for example, in an about 2-fold to an about 6-fold excess, calculated on the basis of starting material used. Primary and secondary alkanols are advantageously used in equimolar amounts to an about 3-fold excess and are added gradually during the reaction; tertiary alkanols are usually employed in excess amounts, advantageously in an at least 3-fold, for example, in an about 5-fold to an about 100-fold excess and may simultaneously serve as the sole diluent.

The cleavage of an alkoxy radical-forming oxidation reagent, e.g. of a peroxide, and of the reagent capable of furnishing an esterified hydroxy group by homolytic cleavage, such as a heavy metal acylate, especially of an alkoxy-heavy metal compound, such as a preferred alkoxy-lead-IV-acylate compound, occurs in a manner known per se, for example, by thermic cleavage (which may necessitate cooling or heating), or, particularly advantageous, by irradiation, for example, with ultraviolet light or light of longer wave length, for example, in the visible range, if desired, in the presence of sensibilisators. The ultraviolet light has preferably a main wavelength above 280 m$\mu$, primarily a range of about 300 m$\mu$ to about 350 m$\mu$; this may be achieved by filtration of the ultraviolet light through a suitable filter, for example a glass filter, or through a suitable solution, such as a salt solution, or through other liquids, such as benzene or toluene capable of absorbing light of short or wave lengths. The ultraviolet light is preferably generated by means of a mercury vapor high pressure lamp.

The use of alkoxy-lead-IV-acylate, such as acetate compounds, formed during the reaction, as the alkoxy radical-forming oxidation reagent and the reagent capable of furnishing the acyloxy group by homolytic cleavage, particularly while irradiating with ultraviolet light of a main wave length above 280 m$\mu$, represents the preferred embodiment of the present invention. Usually, one proceeds by treating a 5-unsubstituted, 2,2-disubstituted 3-acyl-thiazolidine 4-carboxylic acid derivative, like, for example, the compound of Formula II, with a lead-IV-acylate while irradiating with ultraviolet light having a main wave length of above 280 m$\mu$ in the presence of an alkanol, particularly a lower alkanol, such as one of the above mentioned lower alkanols, preferably tert.-butanol.

The process of the invention is carried out in presence of a solvent or of a solvent mixture. Apart from a tert.-alkanol, which may be used during the in situ preparation of an alkoxy-heavy metal-acylate compound, or from a suitable compound furnishing a halogen by homolytic cleavage, such as bromotrichloromethane, which reagents, when used in excess may serve as solvents, hydrocarbons, for example, such as aromatic hydrocarbons, e.g. benzene, or halogenated hydrocarbons, such as aliphatic or aromatic halogenated hydrocarbons, e.g. methylene chloride or chlorobenzene, as well as acetic acid or mixtures thereof, may serve as diluents. The reaction takes place while cooling, at room temperature or while heating, advantageously with gentle warming up to about 100° C.; a temperature interval of between 0° C. and 50° C. is preferred, when using the alkoxy-heavy metal acylate compounds prepared during the reaction. If necessary, one works in an inert gas atmosphere, for example, under nitrogen, if desired, in a closed vessel.

In the resulting compounds, substituents may be converted to other substituents by methods which are in themselves known. Thus, resulting acid derivatives, such as esters, may be converted to the free acids without one of the acyl groups, especially an easily removable acyl group, in the 3-position, such as a tert.-butyloxycarbonyl group, being removed. A carboxyl group esterified with a 2,2,2-trichlorethanol may in a specific manner be converted to the free carboxyl group by means of reducing more closely in my application No. 573,800, filed Aug. agents; this reaction is, for example, described more closely in my application No. 573,800, filed Aug. 22, 1966 now abandoned. Suitable reducing agents are chemical reducing agents, such as nascent hydrogen, which is, for example, obtained by the action of metals, metal alloys or metal amalgams on hydrogen-releasing reagents, for example, zinc, zinc alloys, such as zinc/copper, or zinc amalgam used in the presence of acids, such as organic carboxylic acids, e.g. acetic acid, or of alcohols, such as lower alkanols, furthermore, alkali metal amalgam, for example, sodium amalgam or potassium amalgam, or aluminum amalgam, used in the presence of moist ether or of lower alkanols, as well as alkali metals, for example, lithium, sodium or potassium, or alkaline earth metals, for example, calcium, used in the presence of liquid ammonia, optionally with the addition of alcohols, such as a lower alkanol. In addition, an ester with 2,2,2-trichloroethanol may also be converted into the free acid by treatment with strongly reducing metal salts, such as chromium-II-compounds, e.g. chromium-II-chloride or chromium-II-acetate, advantageously in the presence of aqueous media containing water-miscible organic solvents, such as lower alkanols, lower alkane carboxylic acids or ethers, e.g. methanol, ethanol, acetic acid, tetra-hydro-furane, dioxan, ethyleneglycol dimethylether or diethyleneglycol dimethylether.

In a resulting compound having a free carboxyl group, the latter may be converted into its functional derivatives, for example, into its esters, amides, hydrazides or azides, by methods which are in themselves known. Thus, the carboxyl group may, for example, be esterified by treatment with a diazo compound, such as a diazo-lower alkane, for example, diazomethane or diazoethane, or a phenyl-diazo-lower alkane, e.g. diphenyl-diazomethane, or by treatment with a hydroxy-compound suitable for esterification, such as, for example, an alcohol, as well as a phenol compound or an N-hydroxy-nitrogen compound, for example, a hydroxamic acid, in the presence of a suitable esterification agent, such as a carbodiimide, for example, dicyclohexylcarbodiimide, as well as carbonyldiimidazole, or by any other known and suitable esterification process, such as reaction with a reactive ester of the hydroxy compound, especially of an alcohol and a strong inorganic acid or a strong organic sulphonic acid, if desired, in presence of a salt-forming base. Amides are obtained from the free carboxylic acid by methods in themselves known; sulphonamides are, for example, obtained by treatment with a sulphonylisocyanate.

A functionally converted carboxyl group in a resulting compound may also be converted, by methods in themselves known, to another, functionally converted carboxyl group, for example, to esterified carboxyl groups by trans-esterification, such as treatment with a hydroxy compound in the presence of a trans-esterification catalyst. Furthermore, esters, and especially activated esters, such as, for example, esters with N-hydroxy-nitrogen compounds, or anhydrides formed with haloformic acid esters or tri-halogeno-acetic acid halides, may be converted to other esters or to nitrogen-containing derivatives, such as amides or hydrazides by reaction with other hydroxy compounds, such as alcohols or phenol compounds, and with nitrogen-containing reagents, for example, with ammonia, primary or secondary amines, or hydrazines, respectively. In a resulting amide or hydrazide compound having a hydrogen-containing nitrogen atom, the latter may be subsequently substituted, for example, by treatment with a carboxylic or sulphonic acid derivative, such as an acid halide and/or a reactive esterified alcohol, or any other suitable reagent; an N-unsubstituted amide may, for example, be converted to the corresponding nitrile by dehydration.

Resulting mixtures of isomers may be separated into the individual isomers by methods in themselves known, for example, for fractional crystallisation, adsorption chromatography (column or thin layer chromatography) or by other processes. Resulting racemates may be separated into the antipodes by forming a mixture of diastereo-isomeric salts with optically active salt-forming reagents, separation of the mixture into the diastereoisomeric salts, and conversion of the separated salts into the free compounds.

The compounds obtained according to the invention are 2,2-disubstituted 3 - acyl - 5 - R - thiazolidine 4-carboxylic acids, in which R represents an esterified hydroxy group, primarily an acyloxy group or a halogen atom, and their functional derivatives, such as the compounds of Formulae Ia

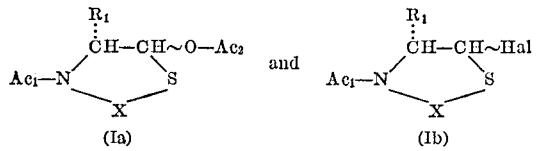

in which $Ac_1$ represents an acyl residue, especially the acyl residue of an active-N-acyl derivative of a 7-aminocephalosporanic acid, for example, a thienylacetyl, such as the 2-thienylacetyl, a chloroethylcarbamyl, such as the 2-chloroethylcarbamyl, or the phenylacetyl residue, or an easily removable acyl residue, such as the residue of a half-ester of carbonic acid, such as the tert.-butyloxycarbonyl residue, $Ac_2$ represents the acryl residue of an organic carboxylic acid, such as the acyl residue of the acyloxy group furnished during the reaction, for example, the acyl residue of an aliphatic carboxylic acid, such as an alkane carboxylic acid, e.g. a lower alkane carboxylic acid, primarily acetic acid, as well as propionic acid, or of an aromatic acid, such as benzoic acid, with these acids being unsubstituted or optionally containing substituents, such as lower alkyl or lower alkoxy groups or halogen atoms or pseudo-halogens, such as trifluoromethyl groups, Hal stands for a halogen atom, particularly a halogen atom with an atomic weight greater than 19, especially a chlorine or bromine atom, as well as an iodine atom, X represents the disubstituted carbon atom of the thiazolidine ring, and $R_1$ denotes a free or, especially, a functionally converted, carboxyl group.

The residue —X— especially stands for the group of formula

in which $R_2$ and $R_3$ represent hydrocarbon residues, especially aliphatic hydrocarbon residues, such as lower alkyl, for example, ethyl, n-propyl, isopropyl or preferably methyl groups, as well as aromatic, especially phenyl groups, or araliphatic hydrocarbon residues, especially phenylalkyl, for example, benzyl or phenylethyl groups, as well as functionally converted, especially esterified, carboxyl groups, such as carbo-lower alkoxy, for example, carbomethoxy groups or carbethoxy groups, or, when $R_1$ and $R_2$ are taken together, represent a bivalent hydrocarbon residue, especially a bivalent aliphatic hydrocarbon residue, such as a lower alkylene group, for example, the 1,4-butylene or 1,5-pentylene group, a phthaloyl group, or an oxo or thiono group. The above-mentioned hydrocarbon residues are unsubstituted or may be substituted, for example, by lower alkyl, such as methyl or ethyl groups, lower alkoxy, such as methoxy or ethoxy groups, halogen, such as fluorine, chlorine or bromine atoms, halogenalkyl, such as trifluoromethyl group, or any other suitable groups.

The group $R_1$ represents a free carboxyl group or, preferably, a functionally converted carboxyl group, especially an esterified carboxyl group. The latter is esterified with any type of hydroxy-compound suitable for esterifying carboxylic acids, such as alcohols, especially aliphatic alcohols, such as alkanols, especially lower alkanols, for example, methanol, ethanol, n-propanol or tert.-butanol, cycloaliphatic alcohols, such as cycloalkanols, for example, cyclohexanol, or araliphatic alcohols, such as phenylalkanols, for example, benzyl alcohol or diphenylmethanol, as well as phenol compounds, especially phenol, or with N-hydroxynitrogen compounds, such as hydroxy- or by free, etherified or esterified hydroxyl groups such as their methyl esters, or N-hydroxyimides, for example, N-hydroxysuccinimide; the above-mentioned hydroxy-compounds may be unsubstituted or may optionally contain lower lower alkyl, lower alkoxy, nitro or trifluoromethyl groups or, especially, halogen atoms, as well as other groups as substituents. Halogenated lower alkanols, such as 2,2,2-trichlorethanol, are especially suitable as substituted hydroxy-compounds esterifying carboxylic acids.

Other functionally modified carboxyl groups $R_1$ are, for example, nitrogen-containing functionally converted carboxyl groups, such as carbamyl groups, which may be unsubstituted, or mono-substituted or disubstituted at the nitrogen atom by aliphatic, alicyclic, aromatic or araliphatic hydrocarbon residues or heterocyclic residues of aromatic character, such as lower alkyl, cycloalkyl, phenyl, phenyl-lower alkyl, phenyl-lower alkylidene or pyridyl residues which may optionally contain lower alkyl groups, free, esterified or etherified hydroxy groups, such as lower alkoxy, aralkoxy, lower alkanoyloxy or aroyloxy groups, halogen atoms, nitro or trifluoromethyl groups, or by free, etherified or esterified hydroxyl groups such as the abovementioned groups of this kind, or by phosphorus-containing residues, or by acyl residues, such as residues of carboxylic acids, for example, of half-esters or half-amides of carbonic acid or lower alkanoyl residues, or residues of sulphonic acids, such as arylsulphonic acids, for example, phenylsulphonyl residues; other functionally modified carboxyl groups $R_1$ are, for example, also nitrile groups, azidocarbonyl groups or hydrazinocarbonyl or azocarbonyl groups which may optionally be monosubstituted or polysubstituted at the nitrogen atom, for example, by the abovementioned substituents of the carbamyl group.

The $Ac_2$—O— group or the halogen atom Hal may be in cis- or trans-position with respect to the group $R_1$; advantageously, the halogen atom Hal is in trans-position to that grouping.

The process also comprises those process modifications in which compounds formed as intermediates are used as starting materials and the remaining process stages are carried out with these, or in which the process is interrupted at any stage, or in which starting materials are used in the form of derivatives, for example, of salts thereof or in which they are formed during the reaction.

Preferably, those starting materials are chosen, and those reaction conditions are selected, which lead to the formation of compounds which previously were listed as being particularly preferred.

The starting materials used in the above process may, for example, be obtained by the process described in my application No. 573,816, filed Aug. 22, 1966, now U.S. Pat. No. 3,479,366. Compounds obtained according to the invention may be converted to 7-amino-cephalosporanic acid and its derivatives; this conversion may, for example, be carried out by the process described in my applications No. 573,891, filed Aug. 22, 1966 (now U.S. Pat. No. 3,522,266), No. 573,865, filed Aug. 22, 1966 (now U.S. Pat. No. 3,481,948), No. 573,815, filed Aug. 22, 1966 (now U.S. Pat. No. 3,483,215), No. 573,886, filed Aug. 22, 1966 (now U.S. Pat. No. 3,468,933), No. 573,866, filed Aug. 22, 1966 (now abandoned), and No. 573,876, filed Aug. 22, 1966 (now U.S. Pat. No. 3,449,336).

The invention is described in detail in the following examples; the temperatures are given in degrees centigrade.

EXAMPLE 1

A solution of 19.38 g. of dried lead tetraacetate in admixture of 450 ml. of benzene and 26.5 ml. of tert.-butanol is treated with 6 g. of L-2,2-dimethyl-3-tert.-butyloxy-carbonyl-thiazolidine 4-carboxylic acid methyl ester, and the mixture is irradiated for 8 hours at 10–15° with a mercury vapor high-pressure lamp with Pyrex filter, while stirring and passing dry nitrogen through it. After a short time a precipitate separates out from the brown solution; at the end of the reaction, the solution is completely colourless and contains a flocculent white precipitate. This is filtered off, and the filtrate is washed with water, dried, and evaporated under water pump vacuum. The residue crystallises spontaneously and is triturated with 75 ml. of pentane; one thus obtains the L-2,2-dimethyl - 3 - tert. - butyloxy - carbonyl-5β-acetyloxy-thiazolidine 4-carboxylic acid methyl ester of the formula

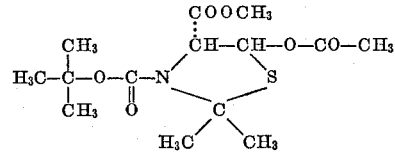

which, after re-dissolving and crystallizing it from a mixture of ether and pentane, melts at 148–150°. The mother liquor, in addition to a small amount of the desired compound, still contains starting material.

EXAMPLE 2

A reaction mixture consisting of 6.46 g. of lead tetraacetate, 10 ml. of tert.-butanol, 110 ml. of absolute benzene and 1 g. of L-2,2-dimethyl-3-tert.-butyloxycarbonyl-thiazolidine 4-carboxylic acid methyl ester is irradiated for 4.5 hours at 15° with a mercury vapor high-pressure lamp with Pyrex filter, while stirring and maintaining a nitrogen atmosphere; during the reaction, the initially brown solution loses its colour and a white flocculent precipitate is formed. The mixture is filtered, and the filtrate washed with water, dried and evaporated in a water pump vacuum. A partially crystalline residue is obtained from which the L-2,2-dimethyl-3-tert.-butyloxycarbonyl-5β-acetyloxy-thiazolidine 4-carboxylic acid methyl ester, M.P. 148–150°, is separated by crystallisation with pentane. The mother liquor, in addition to starting material, contains a further amount of the product as well as biphenyl.

In an analogous manner, irradiation of a mixture of 7.03 g. of lead tetrabenzoate, 10 ml. of tert.-butanol, 110 ml. of absolute benzene and 1 g. of L-2,2-dimethyl-3-tert. - butyloxycarbonyl - thiazolidine 4-carboxylic acid methyl ester yields the L-2,2-dimethyl-3-tert.-butyloxycarbonyl - 5β - benzoyloxy-thiazolidine 4-carboxylic acid methyl ester.

EXAMPLE 3

A crystalline crude product, which contains the L-2,2-dimethyl - 3 - tert. - butyloxycarbonyl-5β-acetyloxy-thiazolidine 4-carboxylic acid methyl ester as the main component is obtained in an analogous manner to that of Example 2, by irradiating for 18 hours 1 g. of L-2,2-dimethyl-3-tert. - butyloxycarbonyl - thiazolidine 4 - carboxylic acid methyl ester and 6.46 g. of lead tetraacetate in 10 ml. of a mixture of equal parts of benzene and tert.-butanol by means of a mercury high pressure lamp provided with a Pyrex filter.

EXAMPLE 4

A solution of 10 g. of L-2,2-dimethyl-3-tert.-butyloxycarbonyl-thiazolidine 4-carboxylic acid methyl ester in 900 ml. of anhydrous benzene is mixed with 100 g. of lead tetraacetate, dried in a high vacuum. Dry nitrogen is passed through the reaction mixture while stirring it and irradiation is performed with a Hanau 70-watt mercury vapour high-pressure lamp Q81 in a Pyrex glass jacket, centrally cooled with water. Within 15 minutes, 6 ml. of methanol and then within 3 hours 21.2 ml. of methanol are dropped in; upon mixing, a temporary local yellow coloration is observed. After 5 hours at 10 to 15°, lead tetraacetate can no longer be identified with potassium iodide starch paper. The reaction mixture is then filtered, and the filtrate washed once with water, dried and evaporated under reduced pressure. The semi-crystalline residue is triturated with 50 ml. of pentane at −10° and kept at this temperature for 2 days. The resulting L - 2,2 - dimethyl - 3-tert.-butyloxycarbonyl-5β-acetyloxy-thiazolidine 4-carboxylic acid methyl ester melts at 147 to 148°.

EXAMPLE 5

A solution of 1 g. of L-2,2-dimethyl-3-tert.-butyloxycarbonyl-thiazolidine 4-carboxylic acid methyl ester in 180 ml. of anhydrous benzene is mixed with 10 g. of dried lead tetraacetate. In a current of dry nitrogen, the mixture is irradiated with a Hanau 70-watt mercury vapour high-pressure lamp Q81 in a Pyrex glass jacket, centrally cooled with water, and a total of 40 ml. of isopropanol is dropped in at a rate of 0.1 ml. per minute; a temporary yellow coloration is observed. After another 40 minutes no more lead tetraacetate, but a major quantity of starting material can be detected. Another 10 g. of lead tetraacetate and 4 ml. of isopropanol are added while irradiating; the isopropanol is added dropwise as described above. After the addition of 2 ml. of isopropanol, lead tetraacetate can no longer be detected. A total of 10 ml. of isopropanol is dropped in and the mixture is then filtered; the filtrate is washed with water, dried and evaporated under reduced pressure. The semi-crystalline residue is crystallized from pentane to yield the crude, crystalline L - 2,2-dimethyl-3-tert.-butyloxycarbonyl-5β-acetyloxy-thiazolidine 4-carboxylic acid methyl ester, M.P. 133 to 139°.

By substituting lead tetrapropionate for the lead tetraacetate and proceeding in a manner analogous to the one indicated above, one obtains the L-2,2-dimethyl-3-tert.-butyloxycarbonyl - 5β - propionyloxy - thiazolidine 4-carboxylic acid methyl ester.

EXAMPLE 6

While irradiating a stirred solution of 6 g. of L-2,2-dimethyl - 3 - tert.-butyloxycarbonyl-thiazolidine 4-carboxylic acid methyl ester in 420 ml. of anhydrous benzene and 30 ml. of tert.-butanol with a Hanau 70-watt mercury vapour high-pressure lamp Q81 in a Pyrex glass jacket, centrally cooled with water, there is added a total of 40 g. of lead tetraacetate, dried in a high vacuum, in 4 portions of 10 g. each at intervals of 3 hours. After 13 hours, the supernatant solution has become colourless and contains, according to the potassium iodide starch paper test, no longer any lead tetraacetate; the yellow precipitate, on the other hand, still shows a pronounced positive reaction. After filtering and washing with benzene, the filtrate is agitated with water, filtered through a filter aid (Hyflo) and once more washed with water. The aqueous extracts are extracted with benzene, and the combined benzene solutions are dried and evaporated under reduced pressure. The partially crystalline residue is triturated with about 30 ml. of pentane to yield the crystalline L-2,2-dimethyl-3-tert. - butoxycarbonyl - 5β-acetyloxy-thiazolidine 4-carboxylic acid methyl ester, M.P. 140 to 144°.

The mother liquor is chromatographed on 160 ml. of silica gel, containing 5% of water; 800 ml. of a 1:1-mixture of benzene and hexane elute crude biphenyl which, after recrystallization from methanol and sublimation (at 50 to 70° under 0.5 mm. Hg pressure) melts at 68 to 69°. With 1400 ml. of benzene an unidentified amorphous material and with 1200 ml. of a 19:1-mixture of benzene and ethyl acetate a mixture of 3 components are eluted. On crystallization from ether and pentane, the latter yields a further quantity of L-2,2-dimethyl - 3 - tert.-butyloxy - carbonyl - 5β - acetyloxy-thiazolidine 4-carboxylic acid methyl ester. Another 400 ml. of the 19:1-mixture of benzene and ethyl acetate elute similar mixtures. Further 400 ml. of the same solvent mixture and 400 ml. of a 9:1-mixture of the two solvents contain L-2,2-dimethyl-3-tert.-butyloxycarbonyl-4β-hydroxy-thiazolidine 4-carboxylic acid methyl ester, which is crystallized from pentane and melts at 80 to 86°; $[\alpha]_D^{20} = -3° \pm 2°$ (c.=0.67 in chloroform); infrared absorption bands (in methylenechloride) at 2.80μ, 5.73μ, 5.87μ, 5.97μ, 7.24μ, 7.35μ, 8.65μ and 9.31μ. Further 200 ml. of the above 9:1-mixture and 600 ml. of a 1:1-mixture of benzene and ethyl acetate yield mixtures which, according to the thin-layer chromatogram, contain some L - 2,2 - dimethyl - 3 - tert.-butyloxycarbonyl-5β-hydroxy-thiazolidine 4-carboxylic acid methyl ester.

The mother liquor from the first eluate with a 19:1-mixture of benzene and ethyl acetate (1.36 g.) is refluxed for 21 hours with 0.65 g. of anhydrous sodium acetate in 40 ml. of absolute methanol. After cooling, the reaction mixture is diluted with 200 ml. of methylene chloride, washed with water, dried and evaporated. The residue is chromatographed on 15 g. of silica gel, containing 5% of water. With 20 fractions of 25 ml. each of benzene, a mixture of the starting material with L-2,2-dimethyl-3-tert.-butyloxycarbonyl-5β-tert. - butyloxy - thiazolidine 4-carboxylic acid methyl ester is obtained. Fractions 4 to 7 yield the latter ester on crystallization from pentane, sublimation at 80 to 90° under 0.005 mm. Hg pressure and two recrystallizations from pentane; M.P. 98 to 99°; $[\alpha]_D^{20} = +145° \pm 1°$ (c.=1.100 in chloroform); infrared absorption bands (in methylene chloride) at 5.70μ, 5.91μ, 7.25μ, 7.33μ, 8.58μ and 9.50μ. The mixtures eluted with a 19:1-mixture of benzene and ethyl acetate (12 fractions of 25 ml. each) contain predominantly the L-2,2-dimethyl - 3 - tert.-butyloxycarbonyl - 5β - hydroxy - thiazolidine 4-carboxylic acid methyl ester.

EXAMPLE 7

A mixture of 0.84 g. of L-2,2-dimethyl-3-tert.-butyloxycarbonyl-thiazolidine 4-carboxylic acid -N-phenylsulphonylamide, 6.46 g. of lead tetraacetate and 10 ml. of tert.-butanol in 110 ml. of absolute benzene is irradiated under nitrogen for 4½ hours at 15° with a mercury vapour high-pressure lamp (Hanau Q81, 80-watt)

through a water-cooled Pyrex glass filter. In contrast to the undissolved material, no tetravalent lead salt can be identified in the solution. The mixture is filtered, and the filtrate washed with water, filtered through a filter aid, dried and evaporated under vacuum. The residue is chromatographed on 40 g. of silica gel containing 5% of water. With 200 ml. of benzene and 100 ml. of a 19:1-mixture of benzene and ethyl acetate, a mixture containing biphenyl is eluted. A further quantity of this mixture is obtained with 160 ml. of the same solvent mixture, whereas with 100 ml. of a 9:1-mixture of benzene and ethyl acetate, a crude product is eluted. A further 600 ml. of the 9:1-mixture of benzene and ethyl acetate furnish the desired L-2,2-dimethyl-3-tert.-butyloxycarbonyl - 5β - acetyloxy - thiazolidine 4-carboxylic acid-N-phenylsulphonylamide of the formula

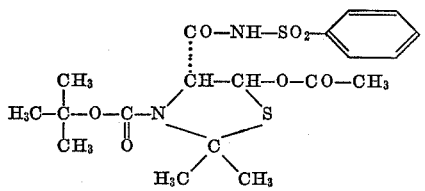

which melts at 150 to 152° on recrystallization from a mixture of methylenechloride, ether and pentane; $[\alpha]_D^{20} = +57° \pm 1°$ (c.=1.032 in chloroform); ultraviolet absorption spectrum (in ethanol) $\lambda_{max.}$ 223 m$\mu$ ($\epsilon$=23000), 260 m$\mu$ ($\epsilon$=810), 267 m$\mu$ ($\epsilon$=1100) and 273 m$\mu$ ($\epsilon$=920); infrared absorption spectrum (in methylenechloride): bands at 3.0$\mu$, 5.73$\mu$, 5.83$\mu$, 5.95$\mu$, 6.07$\mu$, 7.06$\mu$, 7.21$\mu$, 7.34$\mu$, 8.20$\mu$, 8.43$\mu$, 8.50$\mu$, 8.65$\mu$, 9.20$\mu$, 9.85$\mu$ and 10.36$\mu$.

EXAMPLE 8

A suspension of 5.5 g. of lead tetraacetate, dried in a high vacuum, in a mixture of 130 ml. of anhydrous benzene and 10 ml. of tert.-butanol is mixed with 1.18 g. of L - 2,2 - dimethyl - 3 - tert.-butyloxycarbonyl-thiazolidine 4-carboxylic acid 2,2,2-trichloroethyl ester. Sedimentation of the suspension is prevented with the aid of a weak current of nitrogen. Irradiation is performed with a mercury vapour high pressure lamp (Hanau Q81, 70-watt) in a Pyrex glass jacket, centrally cooled with water. After 6 hours, a colourless suspension is obtained which according to the potassium iodide starch test no longer contains any tetravalent lead salt. The whole is filtered and the residue is washed with benzene; the filtrate is washed twice with water, dried and evaporated under reduce pressure. The colourless oily residue contains, in addition to some biphenyl and starting material, as predominant constituent the L-2,2-dimethyl-3-tert.-butyloxycarbonyl - 5β - acetyloxy - thiazolidine 4-carboxylic acid 2,2,2-trichloroethyl ester of the formula

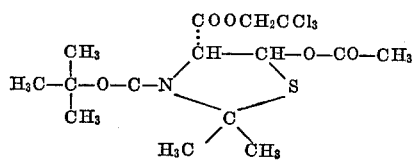

which, after crystallization from pentane, melts at 87°. In a chromatogram of 0.12 g. of the resulting oily crude product on 12 g. of silica gel, the biphenyl is eluted with benzene and with benzene and benzene, containing 1% of ethyl acetate, the 2,2-dimethyl - 3 - tert. - butyloxycarbonyl-4-thiazolidine 4-carboxylic acid 2,2,2-trichloroethyl ester of the formula

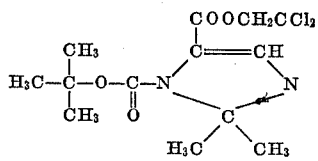

M.P. 68 to 70° after recrystallization from pentane; infrared absorption spectrum, in methylenechloride): bands at 5.79$\mu$, 5.85$\mu$, 5.92$\mu$, 6.40$\mu$, 7.35$\mu$, 7.61$\mu$, 8.48$\mu$, 8.85$\mu$, 9.28$\mu$ and 9.70$\mu$; ultraviolet absorption spectrum (in ethanol) $\lambda_{max.}$ 271 m$\mu$ ($\epsilon$=3220) aid 324 m$\mu$ ($\epsilon$=4100); which has been formed during chromatography, together with unreacted starting material, whereas the desired L-2,2-dimethyl-3-tert. - butyloxycarbonyl - 5β - acetyloxy-thiazolidine 4-carboxylic acid 2,2,2-trichloroethyl ester is eluted with further fractions of benzene, containing 1% of ethyl acetate.

EXAMPLE 9

A solution of 1.1 g. of L-2,2-dimethyl-3-tert.-butyloxycarbonyl-thiazolidine 4-carboxylic acid methyl ester in 15 ml. of bromotrichloromethane is treated with 2.35 g. di-tert.-butyl peroxalate and heated until the gas evolution ceases (about 75 minutes) at a bath temperature of 70° under an atmosphere of nitrogen. By evaporating under reduced pressure, first under water-pump vacuum, then under high vacuum, one obtains a viscous residue, containing the L-2,2-dimethyl-3-tert. - butyloxycarbonyl - 5β-bromo-thiazolidine 4-carboxylic acid methyl ester of the formula

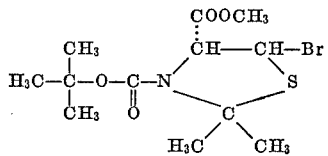

which is used without further purification as follows:

The residue is dissolved in 8 ml. of dimethylformamide and, while cooling with water, is treated with a saturated aqueous solution of 0.75 g. sodium azide and allowed to stand for one hour at room temperature. After adding 30 ml. of water, the organic portion is extracted twice with 25 ml. cyclohexane, the organic extracts are dried and evaporated, and the viscous residue is chromatographed on 60 g. of purified silicagel using 40 ml. fractions of a 39:1-mixture of benzene and ethyl acetate. Fractions 6 to 9 are evaporated to yield a crude product, which according to thin layer chromatography (silicagel; 9:1-mixture of benzene and ethyl acetate; characteristic spot $R_f$=0.5), and the NMR and UV spectra contains the L-2,2-dimethyl-3-tert.-butyl oxy carbonyl-5α - azido-thiazolidine 4-carboxylic acid methyl ester of the formula

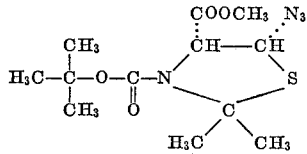

the analytical sample of which melts at 55–57°; $[\alpha]_D$=525°±1° (c.=1.007 in chloroform); infrared absorption bands (in methylene chloride) at 4.75$\mu$, 5.70$\mu$, 5.90$\mu$, 7.35$\mu$, 7.45$\mu$, 8.40$\mu$, 8.65$\mu$ and 9.35$\mu$; ultraviolet absorption band (in 95% ethanol) $\lambda_{max.}$ 208 m$\mu$ ($\epsilon$=3620); and the 2,2-dimethyl-3-tert.-butyloxycarbonyl-4-thiazoline 4-carboxylic acid methyl ester of the formula

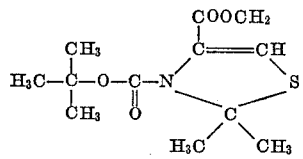

EXAMPLE 10

A solution of 0.14 g. of L-2,2-dimethyl-3-tert.-butyloxycarbonyl-5β-acetyloxy-thiazolidine 4-carboxylic acid 2,2,-2-trichloroethyl ester in 3.5 ml. of 90% acetic acid is mixed with 1.5 g. of zinc dust, and the reaction mixture is stirred for 4 hours at room temperature. The batch is filtered and the residue rinsed with 4 ml. of acetic acid and 200 ml. of benzene; the filtrate is washed 5 times with water, dried over magnesium sulphate and evaporated. The residue crystallizes on being triturated with a mixture of pentane and ether and is recrystallized from a mixture of ether and hexane. The resulting L-2,2-dimethyl-3-tert.-butyloxycarbonyl-5β - acetoxy - thiazolidine 4-carboxylic acid of the formula

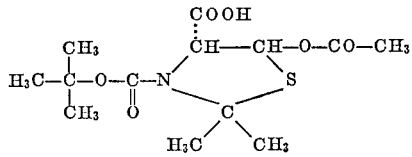

melts at 145–146° after having been sublimed at 127° under a pressure of 0.001 mm. Hg; optical rotation $[\alpha]_D^{20}=225°$ (c.=0.93 in chloroform); infrared absorption bands (in methylene chloride) at 5.75μ, 5.90μ and 8.25μ.

What is claimed is:

1. Process for the manufacture of a member selected from the group consisting of 3-acyl-5-acyloxy-2,2-di-lower alkylthiazolidine 4-carboxylic acid esters, amides and nitriles, in which the acyl group in 3-position is the acyl residue of a half-ester of carbonic acid, and the acyl portion of the acyloxy group in 5-position is the acyl residue of a lower alkane carboxylic acid, which comprises reacting a member selected from the group consisting of a 5-unsubstituted 3-acyl-2,2-di-lower alkyl-thiazolidine 4-carboxylic acid ester, amide and nitrile, in which the acyl group in 3-position has the above-given meaning, with an oxidizing lead-IV-acylate, in which the acyl portion is the acyl residue of a lower alkane carboxylic acid, in the presence of a lower alkanol while irradiating with ultraviolet light.

2. Process according to claim 1, wherein lead tetraacetate is used as the heavy metal acylate.

3. Process according to claim 1, wherein tert-.butanol is used as the lower alkanol.

4. Process according to claim 1, wherein the reaction is carried out by treating the starting material with an about 2-fold to 6-fold excess of lead tetraacetate in the presence of an about equimolar amount to an about 100-fold excess of a lower alkanol, calculated on the basis of lead tetraacetate used, while irradiating with ultraviolet light of a main wave length range between about 300 mμ and about 350 mμ.

5. Process according to claim 4, wherein an about 3-fold to about 100-fold excess, calculated on the basis of lead tetraacetate used, of tertiary butanol is used as the lower alkanol.

References Cited

UNITED STATES PATENTS 3,498,996  3/1970  Woodward _____ 260—306.7

OTHER REFERENCES

Cason: Essential Principles of Organic Chemistry, Prentice-Hall, Englewood Cliffs, N.J., p. 398, (1956).

Theilheimer: Synthetic Methods of Organic Chemistry, 13, S. Kerger, New York, p. 406 (1959).

ALEX MAZEL, Primary Examiner

R. J. GALLAGHER, Assistant Examiner